US009709416B2

United States Patent
Mizuno et al.

(10) Patent No.: US 9,709,416 B2
(45) Date of Patent: Jul. 18, 2017

(54) DESTINATION PROPOSAL SYSTEM, DESTINATION PROPOSAL METHOD, AND STORAGE MEDIUM FOR PROGRAM PRODUCT

(71) Applicant: DENSO CORPORATION, Kariya, Aichi-pref. (JP)

(72) Inventors: Nobuhiro Mizuno, Ichihara (JP); Yasuhiro Shimizu, Tokoname (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 125 days.

(21) Appl. No.: 14/649,891

(22) PCT Filed: Nov. 18, 2013

(86) PCT No.: PCT/JP2013/006742
§ 371 (c)(1),
(2) Date: Jun. 4, 2015

(87) PCT Pub. No.: WO2014/087583
PCT Pub. Date: Jun. 12, 2014

(65) Prior Publication Data
US 2015/0300836 A1    Oct. 22, 2015

(30) Foreign Application Priority Data
Dec. 5, 2012  (JP) ................. 2012-266338

(51) Int. Cl.
*G01C 21/36* (2006.01)
*G09B 29/10* (2006.01)
(52) U.S. Cl.
CPC ..... *G01C 21/3617* (2013.01); *G01C 21/3697* (2013.01); *G09B 29/106* (2013.01)

(58) Field of Classification Search
CPC ............ G01C 21/3617; G01C 21/3697; G09B 29/106
See application file for complete search history.

(56) References Cited

U.S. PATENT DOCUMENTS

| | | |
|---|---|---|
| 2005/0149254 A1 | 7/2005 | Yamada et al. |
| 2007/0005235 A1 | 1/2007 | Suzuki et al. |
| | (Continued) | |

FOREIGN PATENT DOCUMENTS

| | | |
|---|---|---|
| JP | 2004061392 A | 2/2004 |
| JP | 2005030886 A | 2/2005 |
| | (Continued) | |

OTHER PUBLICATIONS

International Search Report and Written Opinion (in Japanese with English Translation) for PCT/JP2013/006742, mailed Feb. 10, 2014; ISA/JP.

*Primary Examiner* — Basil T Jos
(74) *Attorney, Agent, or Firm* — Harness, Dickey & Pierce, P.L.C.

(57) ABSTRACT

In a living area data generation section, a road link having the number of times of traveling not less than a predetermined number of times is acquired based on travel history data, and a predetermined area including the road link is determined as a living area. In a user model generation section, based on the travel history data, the number of outings is acquired by necessary time for outing, according to whether the destination is in a living area or non-living area, and model data of user's outing pattern is generated. In a search condition determination section, based on the model data, a facility search range is determined, and a ratio between the numbers of facilities to be searched for from the living area and non-living area is determined as a search condition. In a facility search section, search is conducted (Continued)

for facilities conforming to the condition and to be presented.

17 Claims, 11 Drawing Sheets

(56) References Cited

U.S. PATENT DOCUMENTS

| | | |
|---|---|---|
| 2007/0005242 A1 | 1/2007 | Kato et al. |
| 2009/0319176 A1 | 12/2009 | Kudoh et al. |

FOREIGN PATENT DOCUMENTS

| | | |
|---|---|---|
| JP | 2005033464 A | 2/2005 |
| JP | 2005207782 A | 8/2005 |
| JP | 2007010570 A | 1/2007 |
| JP | 2007010572 A | 1/2007 |
| JP | 2007256075 A | 10/2007 |
| JP | 2007264764 A | 10/2007 |
| JP | 2008136193 A | 6/2008 |
| JP | 2009115594 A | 5/2009 |
| JP | 2010079608 A | 4/2010 |
| JP | 2012057957 A | 3/2012 |
| JP | 2012073061 A | 4/2012 |

FIG. 2

| DATE AND TIME | POINT | LINK |
|---|---|---|
| 5/25 8:02 | HOME (DEPARTURE) | |
| 5/25 8:03 | | L1006 |
| 5/25 8:04 | | L1046 |
| 5/25 8:07 | | L1047 |
| 5/25 8:11 | | L1032 |
| 5/25 8:15 | | L1033 |
| 5/25 8:20 | | L1035 |
| 5/25 8:26 | COMPANY (ARRIVAL) | |
| 5/25 17:26 | COMPANY (DEPARTURE) | |
| 5/25 17:28 | | L1035 |
| ⋮ | ⋮ | ⋮ |

FIG. 3

| CLASSIFICATION | ITEM |
|---|---|
| ENTIRETY | NUMBER OF DAYS OF TRAVELING |
| | NUMBER OF TIMES OF TRAVELING |
| | FINAL DATE AND TIME OF TRAVELING |
| ARRIVAL PLACE | ADDRESS |
| | ADJACENT LINK |
| | NUMBER OF TIMES, FREQUENCY, RATIO |
| | FINAL DATE AND TIME |
| | TYPE |
| PASSING LINK | LINK ID |
| | NUMBER OF TIMES OF TRAVELING |
| | FINAL PASSING DATE AND TIME |

DESTINATION PROPOSAL SYSTEM, DESTINATION PROPOSAL METHOD, AND STORAGE MEDIUM FOR PROGRAM PRODUCT

CROSS REFERENCE TO RELATED APPLICATIONS

This application is a U.S. National Phase Application under 35 U.S.C. 371 of International Application No. PCT/JP2013/006742 filed on Nov. 18, 2013 and published in Japanese as WO 2014/087583 A1 on Jun. 12, 2014. This application is based on and claims the benefit of priority from Japanese Patent Application No. 2012-266338 filed on Dec. 5, 2012. The entire disclosures of all of the above applications are incorporated herein by reference.

TECHNICAL FIELD

The present disclosure relates to a system to propose destination(s).

BACKGROUND ART

There is conventionally known an application to propose destination candidates as in Patent Literature 1. Under the application in Patent Literature 1, the content of an occupant's remark in a vehicle is separated into word units, and a speech recognition unit recognizes a genre. When a final determination condition is satisfied regarding a destination genre candidate, destination candidates corresponding to the genre are presented.

PRIOR ART LITERATURES

Patent Literature

Patent Literature 1: JP-2009-115594 A

SUMMARY OF INVENTION

The conventional application can propose destinations in a genre desired by a user, but cannot always propose destinations in places which the user can easily visit.

It is an object of the present disclosure to provide a destination proposal system capable of proposing destinations in places which the user can easily visit.

According to an example of the present disclosure, a destination proposal system is provided as including the followings. A map data storage part is included to hold map data including facility data. A travel history data storage part is included to hold travel history data that are (i) data on a road link where a vehicle has travelled and (ii) data on an arrival point. A living area data generation section is included to acquire a road link where the number of times of traveling is equal to or higher than a predetermined criterion based on the travel history data, determine a predetermined area including the road link as a living area, and generate living area data. A user model generation section is included to assume one outing as a travel that departs from a hub point and returns to the hub point, the number of times of departing from the hub point being equal to or greater than a predetermined number of times, acquire, based on the travel history data, the number of outings with respect to either (i) each of necessary times required for outings or (ii) each of distances to destinations of outings, in accordance with whether the destination of outing is in a living area or a non-living area, and generate model data of an outing pattern of a user. A search condition determination section is included to determine, using the model data, a facility search range based on either (i) a maximum value or a mean value of the required times for outings or the distances to destinations, or (ii) the required time or the distance to destination having the number of outings that exhibits a maximum frequency value, and determine a ratio between (i) the number of facilities to be searched for from the living area and (ii) the number of facilities to be searched for from the non-living area, based on the number of outings to the living area and the number of outings to the non-living area. A facility search section is included to perform a search that searches for facilities in the living area and facilities in the non-living area corresponding to the ratio from the map data storage part within the facility search range determined by the search condition determination section. An output part is included to present facilities found through the search to the user.

Thus, a facility search range is determined based on the required times for outings or distances to destinations of the outings in the past, acquired from the travel history data. This enables to propose facilities within the user's activity range as destination candidates. Further, it is assumed that an area including a road link where the number of times of traveling is equal to or higher than a predetermined criterion is a living area, while an area other than the living area is a non-living area. Searching for facilities from the living area and the non-living area at a ratio based on the past outing data enables to propose appropriate facilities conforming to the user's behavior pattern. Note that the user's living area is not determined in accordance with distance from a hub point but with reference to the number of times of traveling of the road link. This enables to prevent an area, which is close to the hub point (e.g. the user's home) but which the user has never visited, from being included in the living area, appropriately determining the user's living area.

In the destination proposal system according to the example, the user model generation section may generate the model data with respect to either day of week of departing or time zone of departing, and the search condition determination section may determine a facility search condition based on the model data with respect to either day of week of departing or time zone of departing that is, respectively, identical to day of week of departing or time zone of departing of departure date and time for destination proposal.

Thus, using the model data of the same day of week or time zone enables to appropriately predict the user's activity range and behavior pattern and to propose destinations. Further, the user model generation section generates model data depending on situation such as weather, presence/absence of coocupant, and amount of residual gasoline, in addition to day of week or time zone of departure. Generating model data by such detailed situation and determining a search condition based on the model data enables to propose destinations acceptable for the user.

In the destination proposal system according to the example, the living area data generation section may acquire either (i) a road link where the number of times of traveling is equal to or greater than a predetermined number of times or (ii) a road link where the number of times of traveling in a predetermined period is equal to or greater than a predetermined number of times.

This configuration can acquire a road link where the user frequently travels. Further, with reference to a predetermined number of times in a predetermined period, travel history data before the predetermined period is excluded from the object of determination. This can generate appropriate living area data with new travel history data, and exclude an area, which the user frequently visited in the past but has not visited recently, from the living area, for instance. Note that the number of times of traveling as a criterion for determination may be determined based on length of the predetermined period from now on. For example, when the predetermined period is 1 year, the predetermined number of times is 40 times. When the predetermined period is 3 months, the predetermined number of times is 10 times. Thus, the predetermined number of times may be proportional to the period. Further, to exclude a road where the user has not traveled recently, exclusion of a road link where the user has not traveled for a predetermined period may be added to the criterion for determination. For instance, "excluding a road link where the user has not traveled for 1 month" enables to exclude a road link, where the user frequently traveled 3 to 2 months before but has never traveled for 1 month, from road links where the user frequently travels.

Note that, determining with reference to the number of times of traveling being 1 or more enables to acquire a road link where the user traveled in the predetermined period as a road link where the user frequently travels.

In the destination proposal system according to the example, the living area data generation section may determine a living area as either (i) an area arrivable from the road link within a predetermined time or (ii) an area within a predetermined distance from the road link.

This configuration can determine an area including a periphery of a road link where the user frequently travels as a living area. It is desirable to determine the periphery of the road link where the user frequently travels as a living area since the user visits the periphery of the road link where the user frequently travels more easily than a periphery of a road link where the user does not travel at all. Note that the predetermined time and predetermined distance defining a living area may be determined in accordance with required time or distance from a hub point. For example, when the required time to a road link is 30 minutes, an area arrivable within 3 minutes from the road link is determined as a living area, with reference to 1/10 of the required time, 3 minutes. When the required time is 60 minutes, an area arrivable from the road link within 6 minutes is determined as a living area, with reference to 1/10 of the required time, 6 minutes. Further, the road link itself where the user frequently travels may be determined as a living area. This determination corresponds to a case where required time from a road link which the user frequently travels is 0 minute.

In the destination proposal system according to the example, the output part may output advertisement data regarding a facility in the living area, while outputting outline data regarding a facility in the non-living area.

This configuration can provide a user with appropriate information in accordance with whether or not a facility is in a living area. That is, since a facility in the living area is seen from a road where the user frequently travels, the use may know the outline of the facility even though the user has never visited the facility. Outputting advertisement data of such a facility in the living area enables to have the user know more information. By contrast, the user does not know a facility itself in a non-living area. It is thus desirable to have the user know the outline of the facility with facility outline data. When the user is then interested in the facility, more detailed information may be provided in accordance with the user's instruction.

In the destination proposal system according to the example, the facility search section may search for either (i) a facility which the user has never visited or (ii) a facility having the number of visits being equal to or smaller than a predetermined number of times, by referring to the travel history data.

This configuration can propose a facility, which the user has never visited or unfamiliar with, as a destination. Note that a facility which the user frequently visits may be estimated by destination estimation.

In the destination proposal system according to the example, the facility search section may exclude, from search objects, a facility that the user has visited and stayed within a time that is equal to or less than a predetermined threshold value determined depending on the facility, by referring to the travel history data.

A facility which the user has visited but staying time of which is equal to or less than a predetermined threshold value may be assumed to be not liked by the user. Appropriate destination candidates may be proposed to the user by excluding such facility from search objects. Note that the predetermined threshold value is determined depending on a facility since time necessary to use the facility differs in accordance with the facility. For example, a convenience store or a service station is assigned with the threshold value of 3 minutes; a department store is assigned with the threshold value of 60 minutes; and a zoological garden or amusement park is assigned with the threshold value being 120 minutes.

According to an example of the present disclosure, a destination proposal method is provided in a destination proposal system including (i) a map data storage part holding map data including facility data, and a travel history data storage part holding travel history data that are (i) data on a road link where a vehicle has travelled and (ii) data on an arrival point. The method includes the following. A living area data generating is included which acquires a road link where the number of times of traveling is equal to or higher than a predetermined criterion based on the travel history data, determines a predetermined area including the road link as a living area, and generates living area data. A user model generating is included which assumes one outing as a travel that departs from a hub point and returns to the hub point, the number of times of departing from the hub point being equal to or greater than a predetermined number of times, acquires, based on the travel history data, the number of outings with respect to either (i) each of necessary times required for outings or (ii) each of distances to destinations of outings, in accordance with whether the destination of outing is in a living area or a non-living area, and generates model data of a user's outing pattern. A search condition determining is included which determines, using the model data, a facility search range based on either (i) a maximum value or a mean value of the required times for outings or the distances to destinations, or (ii) the required time or the distance to destination having the number of outings that exhibits a maximum frequency value, and determines a ratio between (i) the number of facilities to be searched for from the living area and (ii) the number of facilities to be searched for from the non-living area, based on the number of outings to the living area and the number of outings to the non-living area. A facility searching is included which performs a search that searches for facilities in the living area and facilities in the non-living area corresponding to the ratio from the map data storage part within the facility search range determined by the search condition determination section. An outputting is included which that presents facilities found through the search to the user.

This configuration can propose appropriate facilities conforming to the user's activity range and behavior patter, as in the destination proposal system in the above example. Note that various configurations of the destination proposal system in the above example may be applied to the destination proposal method in the present example.

According to an example of the present disclosure, a non-transitory storage medium is provided as containing instructions of a program product, the instructions being read out and executed by a computer to permit the computer to perform a destination proposal. The instructions of the program product include the following. A living area data generating is included which acquires a road link where the number of times of traveling is equal to or higher than a predetermined criterion based on travel history data held in a travel history data storage part holding the travel history data that are (i) data on a road link where a vehicle has travelled and (ii) data on an arrival point, determines a predetermined area including the road link as a living area, and generates living area data. A user model generating is included which assumes one outing as a travel that departs from a hub point and returns to the hub point, the number of times of departing from the hub point being equal to or greater than a predetermined number of times, acquires, based on the travel history data, the number of outings with respect to either (i) each of necessary times required for outings or (ii) each of distances to destinations of outings, in accordance with whether the destination of outing is in a living area or a non-living area, and generates model data of a user's outing pattern. A search condition determining is included which determines, using the model data, a facility search range based on either (i) a maximum value or a mean value of the required times for outings or the distances to destinations, or (ii) the required time or the distance to destination having the number of outings that exhibits a maximum frequency value, and determines a ratio between (i) the number of facilities to be searched for from the living area and (ii) the number of facilities to be searched for from the non-living area, based on the number of outings to the living area and the number of outings to the non-living area. A facility searching is included which performs a search that searches for facilities in the living area and facilities in the non-living area corresponding to the ratio from the map data storage part within the facility search range determined by the search condition determination section. An outputting is included which that presents facilities found through the search to the user.

This configuration, can propose appropriate facilities conforming to the user's activity range and behavior pattern, as in the destination proposal system in the above example. Note that the various configurations of the destination proposal system in the above example may be applied to the program product in the storage medium in the present example.

The present disclosure provides an advantage to propose appropriate facilities conforming to a user's activity range or behavior pattern with the configuration to determine a facility search range based on travel history data and to search for facilities from both living area and non-living area.

BRIEF DESCRIPTION OF DRAWINGS

The above and other objects, features and advantages of the present disclosure will become more apparent from the following detailed description made with reference to the accompanying drawings. In the drawings:

FIG. 2 illustrates an example of data stored in a travel history DB;

FIG. 3 illustrates an example of data summarized from the travel history data;

EMBODIMENTS FOR CARRYING OUT INVENTION

Hereinbelow, a destination proposal system according to embodiments of the present disclosure will be described with reference to the drawings. The destination proposal system according to the embodiments proposes destinations when a user thinks "I want to go somewhere new".

First Embodiment

[Configuration of Destination Proposal System]

Figure 1:
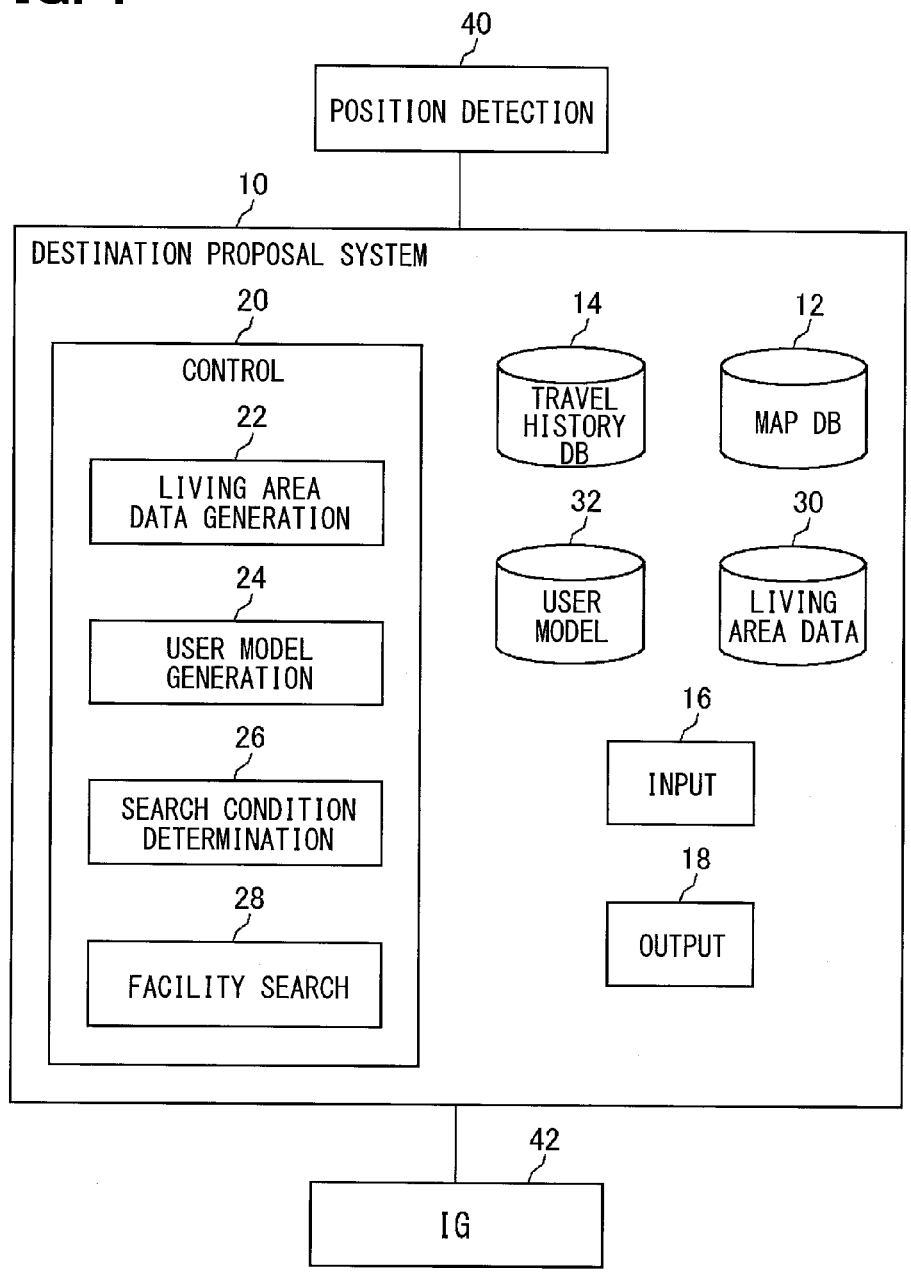
FIG. 1 illustrates a configuration of a destination proposal system according to a first embodiment.

FIG. 1 illustrates a configuration of a destination proposal system 10 according to a first embodiment. The destination proposal system 10 according to the first embodiment is installed and used in a vehicle. The destination proposal system 10 includes a map database (hereinbelow, "map DB") 12 that is a storage holding map data, a travel history database (hereinbelow, "travel history DB") 14 that is a storage holding a travel history of the vehicle, an input part 16 to input a destination proposal request, an output part 18 to output destination candidates, and a control circuit 20 to search for facilities to be proposed as destinations. Note that the database is also referred to as a database storage part, a data storage, or a data storage part.

The destination proposal system 10 is connected to a current position detection unit 40 and an ignition key 42. The current position detection unit 40 includes a geomagnetic sensor to detect an absolute azimuth of the vehicle, a gyroscope to detect a relative azimuth of the vehicle, a distance sensor to detect a travel distance of the vehicle, and a GPS receiver for a global positioning system (GPS) to measure the position of the vehicle based on a radio wave from a satellite. As these sensors respectively have errors of different properties, they are used while respectively complemented with a plurality of sensors. Note that the current position detection unit 40 may include a part of the sensors in accordance with accuracy. Further, the unit 40 may use unshown steering rotation sensor and unshown vehicle speed sensors for the respective driving wheels.

The map DB 12 holds road map data and facility data indicating names and attributes of facilities. The facility data includes facility-related various data such as facility outline data, detailed data, average staying time of the facility, and advertisement data regarding events and sales held at the facility. The map DB may download latest map data from a server provided on a network.

FIG. 2 illustrates an example of data stored in the travel history DB 14. The travel history DB 14 holds history data of a road link where the vehicle has traveled. More particularly, as shown in FIG. 2, the travel history DB 14 includes data on date and time when the vehicle entered a new road link. The destination proposal system 10 accumulates the travel history data based on current position data of the vehicle detected with the current position detection unit 40.

Further, the travel history DB 14 also holds data on date and time of arrival at a point, and data on departure date and time from the point. These data on dates and times and the points correspond to data on date and time and position when the engine of the vehicle started, and data on date and time and position when the engine of the vehicle stopped. These data are accumulated in the travel history DB 14 by acquiring data on time of acquisition of ON/OFF of the ignition key 42 and current position detected with the current position detection unit 40 at that time.

The names of departure point and arrival point are specified by reading facilities corresponding to the position data of departure point and arrival point from the map DB 12. Note that the data shown in FIG. 2 is an example of the travel history data. The travel history data may be held in other format than that shown in FIG. 2.

Returning to FIG. 1, the configuration of the destination proposal system 10 will be described further. The input part 16 includes a keypad. The input part 16, which may also be referred to as an input interface, has a role to receive a destination proposal request. The output part 18 includes a display. The output part 18, which may also be referred to as an output interface, has a role to present destinations in accordance with the destination proposal request. The output part 18 may include a touch panel so as to perform part of the functions of the input part 16.

The control circuit 20 includes, as a configuration to search for destination candidates to be proposed, a living area data generation section 22, a user model generation section 24, a search condition determination section 26, and a facility search section 28. The living area data generation section 22 has a function of reading the travel history data stored in the travel history DB 14, and generating living area data based on the read travel history data. The living area data generation section 22 stores the generated living area data into a living area data storage part 30. Next, the generation of the living area data will be described.

The living area data generation section 22 first reads the travel history data from the travel history DB 14. Note that the living area data generation section 22 may read the travel history data in a recent predetermined period such as "recent 1 year" from the travel history DB 14. This configuration enables to determine a living area in correspondence with the tendency of the user's recent behavior. The living area data generation section 22 summarizes the read travel history data, and acquires entire information, arrival place-based information, and passing link information.

Note that in the present application, "information" is used as an uncountable noun, and in addition, also used as a countable noun.

FIG. 3 illustrates an example of data summarized from the travel history data. The living area data generation section 22 acquires data on the number of days of traveling and the number of times of traveling and data on final traveling date and time, as entire information. The data on the number of days of traveling and the number of times of traveling indicates the capacity of the travel history data as the object of summation. Generally, the reliability of analysis result is higher in accordance with increment in the capacity of travel history data. The final traveling date and time is available as a criterion of recency of the travel history data.

The living area data generation section 22 acquires data on address (latitude and longitude), arrival place adjacent link, the number of times of arrival/frequency/ratio, final arrival date and time, and arrival place type, as arrival point (destination) information. The arrival place (destination) information is acquired by arrival place. That is, the address (latitude and longitude) serves as a key connecting the various data such as the arrival place adjacent link, the number of times of arrival/frequency/ratio, the final arrival date and time, and the arrival place type.

The address (latitude and longitude) is acquired from point data of the travel history data. The arrival place adjacent link is data on a road link adjacent to an arrival place. The arrival place adjacent link is specified from the map data stored in the map DB 12. The arrival place type indicates the type of a facility at the arrival place. The arrival place type is acquired based on the facility data stored in the map DB 12. The facility type includes a restaurant, a hotel, and a tourist facility.

The living area data generation section 22 acquires data on the number of times of traveling of the road link and the final passing date and time of the road link, in connection with ID of the road link, as passing link information.

The living area data generation section 22 generates the living area data using the passing link information among the summarized data shown in FIG. 3. More particularly, the living area data generation section 22 first acquires a road link having a number of times of traveling equal to or greater than a predetermined criterion. In this example, the predetermined criterion includes the number of times of traveling being equal to or greater than a predetermined threshold value (e.g. 10 times). In the present specification, a road link where the number of times of traveling is equal to or greater than the predetermined criterion is referred to as a "normal road link".

Figure 4A:
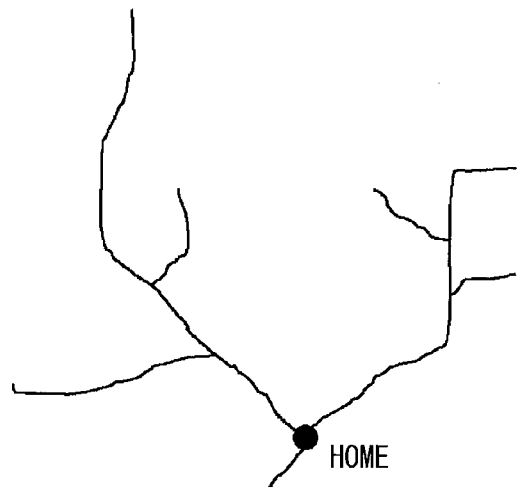
FIG. 4A illustrates an example of a normal road link acquired with a living area data generation section.

FIG. 4A illustrates an example of the normal road link acquired with the living area data generation section 22.

Next, the living area data generation section 22 determines an area arrivable from the normal road link within predetermined time (e.g. 10 minutes) as living area data.

Figure 4B:
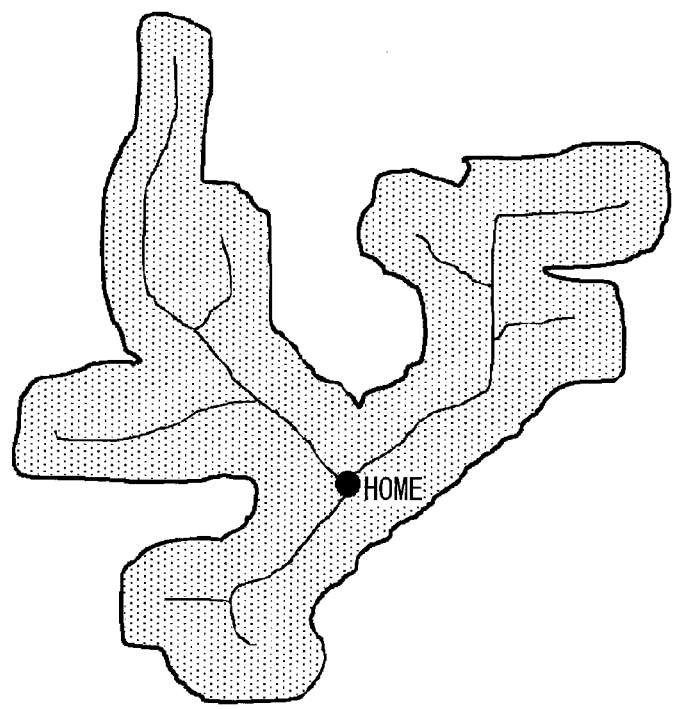
FIG. 4B illustrates an example of living area data.

FIG. 4B illustrates a range arrivable from the normal road link within the predetermined time (e.g. 10 minutes). The area shown in FIG. 4B is determined as a living area. Note that in the present embodiment, the range arrivable within predetermined time is determined as a living area, however, an area within a predetermined distance from the normal road link may be determined as a living area. Further, the predetermined time or predetermined distance to define the range of the living area may be changed in correspondence with distance from home.

Next, the user model generation section 24 will be described. The user model generation section 24 has a function of reading the travel history data from the travel history DB 14, and generating a model representing the user's behavior in accordance with day of week or time zone of departure date and time, based on the read travel history data. Note that as in the case of the living area data generation section 22, the read travel history data may be a travel history data in a recent predetermined period.

The user model generation section 24 classifies the read travel history data into groups based on day of week and time zone of departure date and time. Then the user model generation section 24 generates a histogram of the number of outings by required time between departure/return from/to a hub point by each classified group. In the present embodiment, the user's home is the hub point, however, the hub point may be other point than the home.

The hub point will be described. The hub point is a user's behavioral base. Viewed from the travel history data, the hub point has a plurality of destinations. That is, the hub point has a history of departure for a plurality of points. A typical hub point is a home. For example, a homecoming destination may be a hub point. Further, in a point having a large number of times of departure, the number of destinations is large. Accordingly, a point having a largest number of times of departure, or a point where the number of times of departure is equal to or greater than a predetermined number of times (e.g. 20 times) may be determined as a hub point.

Thus, the number of outings is acquired by day of week and time zone of departure to generate a user model, which enables to quantitatively grasp the tendency of outings in respective days of week and time zones. Note that in the present embodiment, the classification is performed by day of week and time zone, however, the classification may be performed by day of week or time zone.

The user model generation section 24 includes information as to whether the outing destination is in the living area or the non-living area in the generated histogram. For example, when the number of outings in required time of 60 to 90 minutes is counted, the number of outings is counted respectively in the living area and in the non-living area. The counted number of outings to the living area is 8, and the counted number of outings to the non-living area is 2. Thus, the number of outings is counted respectively in the living area and the non-living area, so as to grasp the tendency of the user's outing as to whether the outing is frequently made to the living area or the outing is frequently made to the non-living area in accordance with day of week and time zone.

Figure 5:
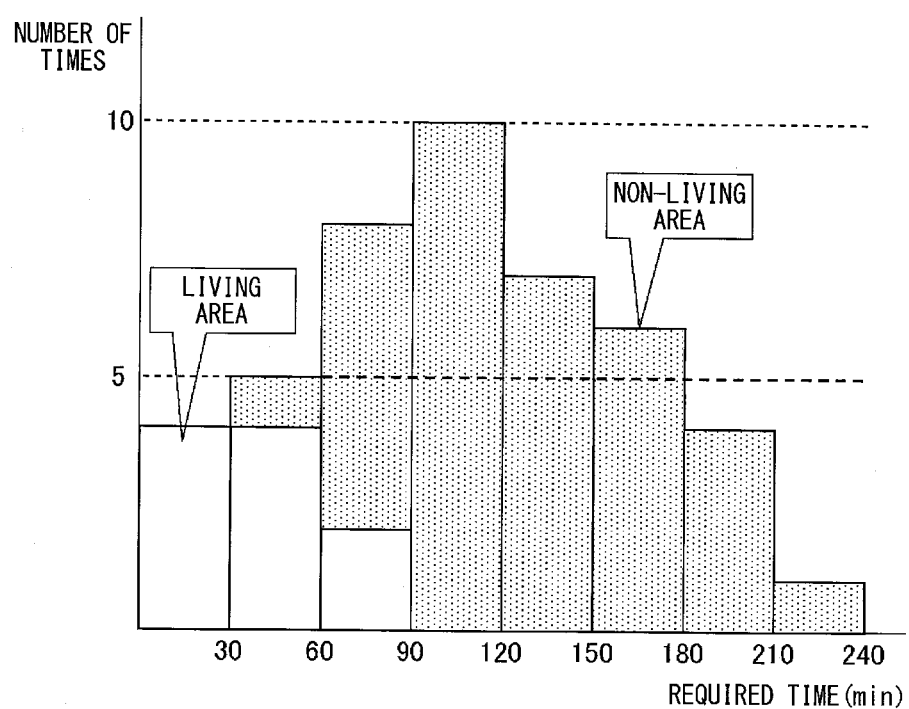
FIG. 5 illustrates an example of a user model.
Figure 6:
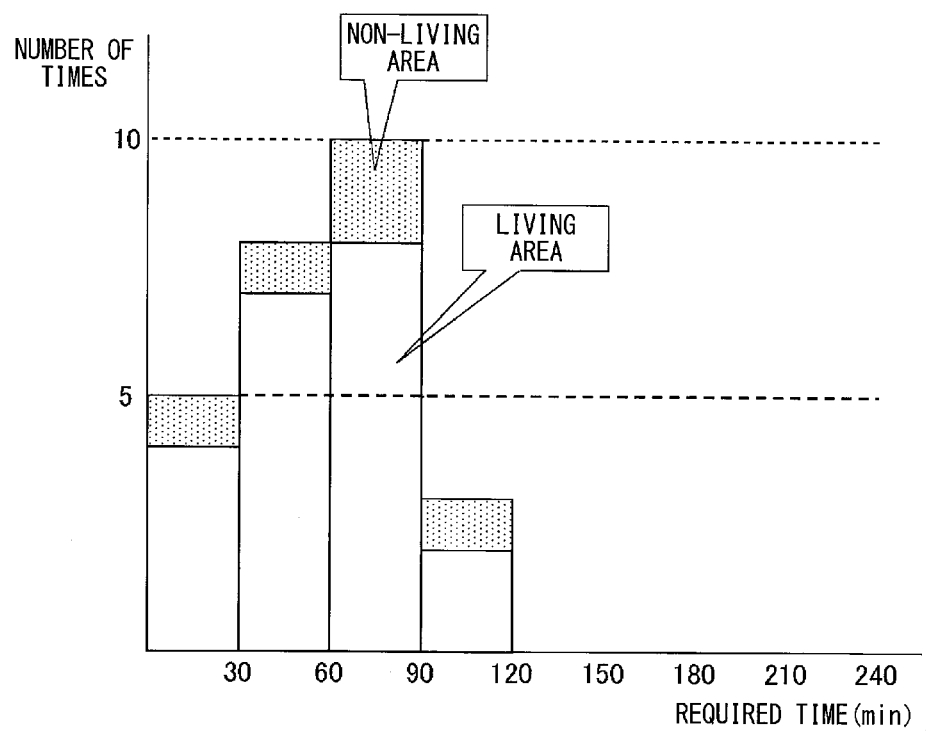
FIG. 6 illustrates another example of the user model.

FIGS. 5 and 6 illustrate examples of a user model. FIG. 5 shows a user model when the departure date and time is "Sunday morning". FIG. 6 shows a user model when the departure date and time is "Sunday afternoon". As shown in FIG. 5, it is understood that when the departure date and time is "Sunday morning", the user frequently visits even a place where the required time is 60 to 180 minutes. Further, as a destination, the number of outings to the non-living area is greater than the number of outings to the living area.

In contrast, as shown in FIG. 6, when the departure date and time is "Sunday afternoon", the largest number of outings to a place where the required time is 60 to 90 minutes is 10 times. The user merely visits a place where the required time is 90 to 120 minutes, though it corresponds to a remote place. Further, as a destination, the number of outings to the living area is greater than the number of outings to the non-living area.

In the present embodiment, this histogram data is the "user model". The user model generation section 24 stores the generated user model data into a user model storage part 32.

Next, the search condition determination section 26 will be described. The search condition determination section 26 has a function of determining a search condition for facilities as destinations to be proposed based on the user model. The search condition determination section 26 determines a search range and a ratio between the numbers of facilities to be searched for from the living area and the non-living area, as a search condition. The details of the processing with the search condition determination section 26 will be described in the description of the operation of the destination proposal system 10.

Next, the facility search section 28 will be described. The facility search section 28 has a function of searching for facilities from the living area and the non-living area at the ratio determined with the search condition determination section 26. The details of the processing with the facility search section 28 will be described in the description of the operation of the destination proposal system 10.

[Hardware Configuration]

Figure 7:
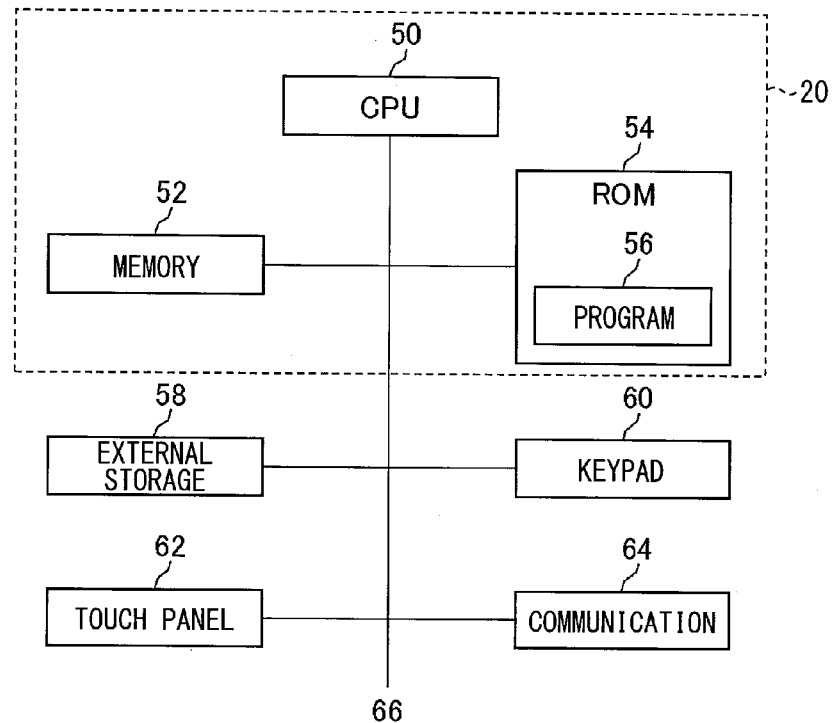
FIG. 7 illustrates a hardware configuration of the destination proposal system according to the present embodiment.

FIG. 7 illustrates a hardware configuration of the destination proposal system 10 according to the present embodiment. The destination proposal system 10 includes a CPU 50, a memory 52, a ROM 54, an external storage part 58, a keypad 60, a touch panel 62, and a communication part 64, connected with a bus 66. The ROM 54 holds a program (also referred to as a program product) 56 to realize the functions of the destination proposal system 10. The external storage part 58, which functions as a storage, serves as the map DB 12 and the travel history DB 14, and further, holds the living area data and the user model data. The communication part 64 has a function of communicating with various equipment installed in the vehicle (including the current position detection unit 40 and the ignition key 42). The CPU 50, the memory 52 and the ROM 54 are included in e.g. the control circuit 20. In this case, the control circuit 20 functions as a computer or a microcomputer.

[Operation of Destination Proposal System]

Figure 8:
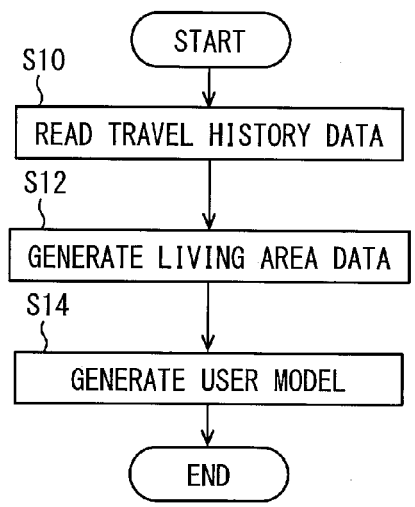
FIG. 8 is a flowchart showing an operation to generate the living area data and the user model.
Figure 9:
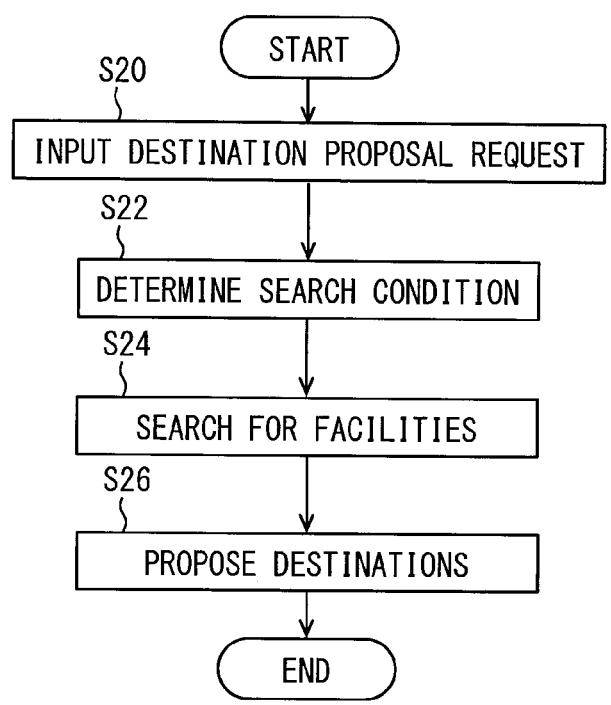
FIG. 9 is a flowchart showing an operation to propose facilities to be proposed.

FIGS. 8 and 9 are flowcharts showing the operation of the destination proposal system 10 with the CPU 50 in the control circuit 20. FIG. 8 shows a flowchart showing the operation to generate living area data and user model based on the travel history data. FIG. 9 shows the operation to propose facilities to be proposed using the living area data and the user model. The operation shown in FIG. 8 corresponds to a stage of learning the user's behavior pattern based on the travel history data. The learning processing may be performed every time when destination proposal is performed, or may be performed when new travel history data has been accumulated to a certain amount, otherwise, may be performed periodically (e.g. by month).

It is noted that a flowchart or the processing of the flowchart in the present application includes sections (also referred to as steps), each of which is represented, for instance, as S10. Further, each section can be divided into several sub-sections while several sections can be combined into a single section. Furthermore, each of thus configured sections can be also referred to as a device or a module. Each or any combination of sections explained in the above can be achieved as (i) a software section in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer.

First, the operation of the learning of the user's behavior pattern with the destination proposal system 10 will be described with reference to FIG. 8. The living area data generation section 22 of the destination proposal system 10 reads the travel history data in a predetermined period from the travel history DB 14 (S10). Next, the living area data generation section 22 generates living area data based on the read travel history data (S12). More particularly, the living area data generation section 22 performs summation processing on the read travel history data, and generates data including the numbers of times of traveling in the respective road links as shown in FIG. 3. The living area data generation section 22 determines a road link where the number of times of traveling is equal to or greater than a predetermined threshold value (e.g. 10 times) as a normal road link. An example of the normal road link is as shown in FIG. 4A. Next, the living area data generation section 22 determines an area arrivable from the normal road link within predetermined time (e.g. 10 minutes) as a living area. An example of the living area data is as shown in FIG. 4B.

Next, the user model generation section 24 generates user model based on the travel history data (S14). As described above, the user model generation section 24 classifies the read travel history data into groups by day of week and time zone of departure time and date. Then, in each of classified respective groups, the user model generation section 24 counts the number of outings to the living area and the non-living area by required time from departure to return to home, and generates a histogram. Examples of the user model are as shown in FIGS. 6 and 5.

Next, the operation of search and proposal of destinations will be described with reference to FIG. 9. The destination proposal system 10 receives input of a destination proposal request from the user (S20). The input part 16 may receive the destination proposal request together with designation of departure date and time, or may receive the destination proposal request with time upon input of the destination proposal request as departure date and time.

The destination proposal system 10 receives the input of the destination proposal request, and performs processing to determine a destination search condition with the search condition determination section 26 (S22). More particularly, the search condition determination section 26 reads the user model on the same day of week and time zone of departure date and time as the day of week and time zone of departure date and time for destination proposal, from the user model storage part 32. Then the search condition determination section 26 determines a range of search for facilities based on the read user model.

For example, when the departure date and time is "Sunday morning", the user model shown in FIG. 5 is referred to. This model teaches that the user visits a place where the maximum required time is 240 minutes. Accordingly, the search condition determination section 26 determines a range where the required time is 240 minutes as a search range. In the present embodiment, the search range is set based on the maximum value of required time. However, the search range may be set based on a required time average value. In the example shown in FIG. 5, as the average required time is 123 minutes, a search range where the required time is 123 minutes is determined as a search range. Further, the search range may be determined based on required time in which the number of outings is the maximum frequency value. In the example shown in FIG. 5, the number of outings in 90 to 120 minutes is 10 times, which is the maximum number of outings. Accordingly, a range where the required time is 120 minutes is determined as a search range.

Figure 11A:
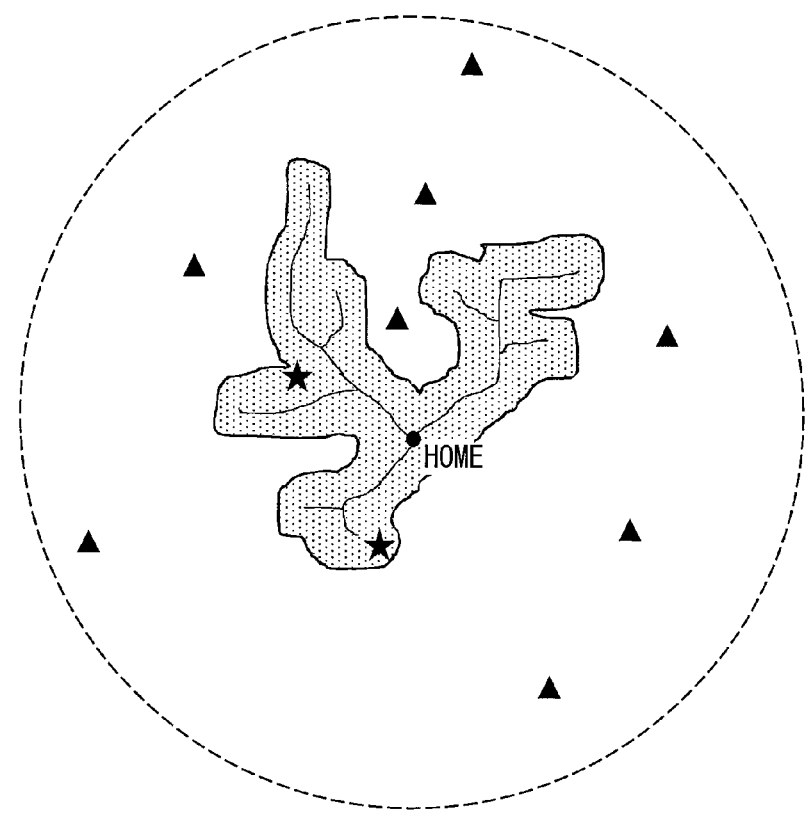
FIG. 11A illustrates an example of a search range where required time is 240 minutes.
Figure 11B:
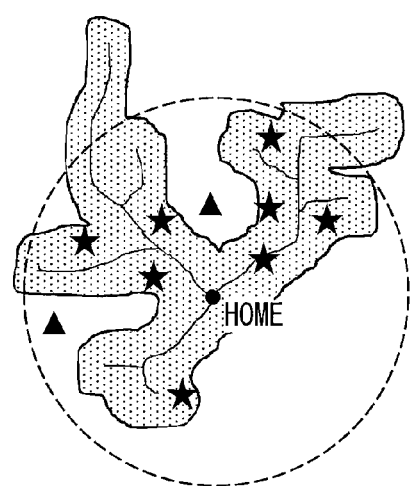
FIG. 11B illustrates an example of the search range where required time is 120 minutes.

FIG. 11A illustrates a search range where the required time is 240 minutes with a dotted line. As the required time is a period between departure from the home and return to the home, the range indicated with the dotted line corresponds to an area where time for arrival from home is 120 minutes. Note that FIG. 11B illustrates a search range where the required time is 120 minutes, indicated with a dotted line.

Next, the search condition determination section 26 refers to the user model and determines a ratio between the numbers of facilities searched for respectively from the living area and the non-living area. For example, when the user model shown in FIG. 5 is referred to, the ratio between the numbers of outings to destinations in the living area and the number of outings to destinations in the non-living area is 2:7. Accordingly, the ratio of number of facilities searched from the living area and the non-living area is set to 2:7.

When the search condition has been determined, the destination proposal system 10 searches for facilities in accordance with the search condition (S24). The detailed facility search operation will be described with reference to FIG. 10. When a search is performed for facilities in accordance with the search condition, then the destination proposal system 10 display-outputs the found facilities as destination candidates on a display (S26). At this time, for the facilities in the living area, together with facility names, advertisement data of the facilities are displayed. In contrast, for the facilities in the non-living area, together with facility names, facility outline data of the facilities are displayed.

Figure 10:
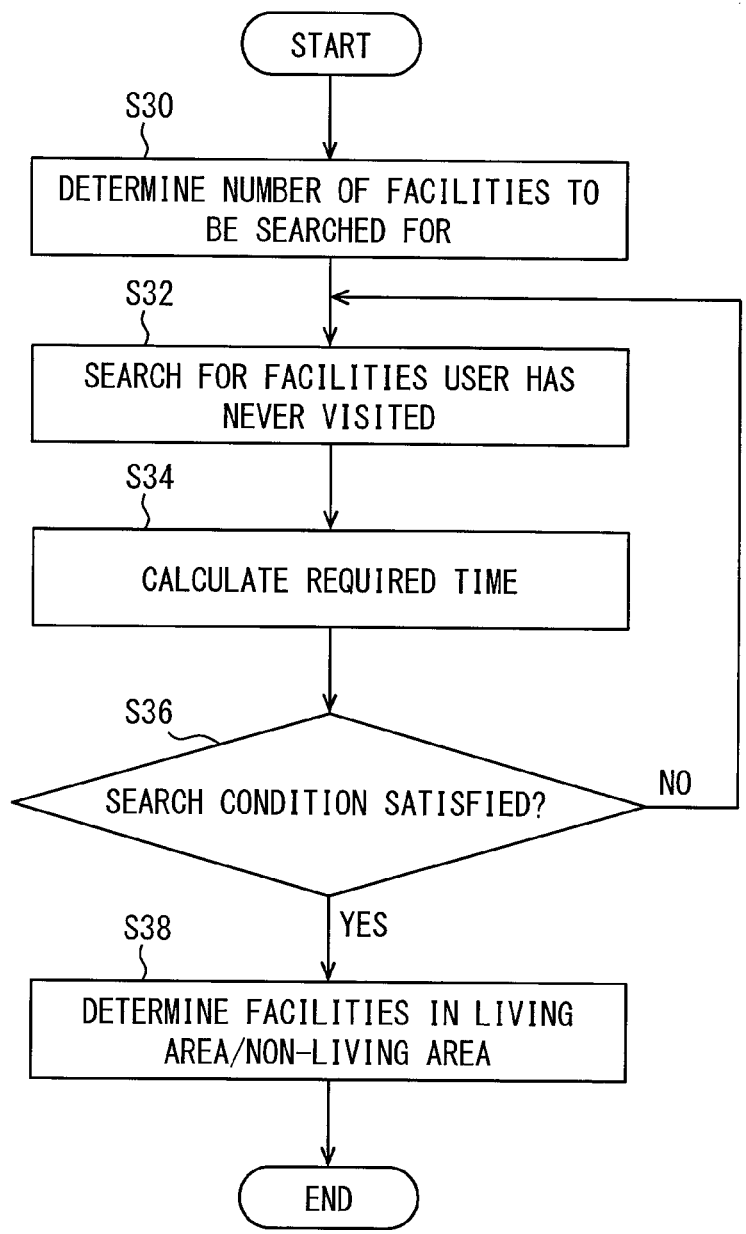
FIG. 10 is a flowchart showing a detailed facility search operation.

FIG. 10 is a flowchart showing the detailed operation of the facility search with the destination proposal system 10. The details of the facility search will be described with reference to FIG. 10.

The facility search section 28 determines the numbers of facilities to be searched for from the living area and the non-living area in accordance with the ratio determined as the search condition (S30). The destination proposal system 10 according to the present embodiment proposes 10 destination candidates. In the example shown in FIG. 5, when the ratio of the numbers of facilities to be searched for from the living area and the non-living area is 2:7, the facility search section 28 determines that the number of facilities to be searched from the living area is 2 and the number of facilities to be searched from the non-living area is 8, so that the numbers of facilities are be the closest to the ratio. Note that the number of facilities to be proposed may be previously determined, or may be set by the user upon input of the destination proposal request.

Next, the search for facilities from the living area will be described. The facility search section 28 reads the living area data from the living area data storage part 30, and acquires the area of the living area. The facility search section 28 searches for a predetermined number of facilities from an overlap area between the search range and the living area (S32). In the example shown in FIG. 11A, the entire area of the living area is the search range. In the example shown in FIG. 11B, an area inside a range surrounded by a dotted line in the living area is the search range.

The facility search section 28 reads the travel history data from the travel history DB 14 and excludes facilities which the user has visited from search objects. The facility search section 28 searches for facilities which the user has not visited. This permits the destination proposal system 10 to propose new facilities which the user has not visited. Further, upon facility search, the facility search section 28 may select facilities at random from the search range, or may select facilities of the same type as that of facilities which the user has visited in the past in consideration of the user's preference.

Next, the facility search section 28 calculates required time for outing to the found facility (S34). More particularly, the facility search section 28 adds required time to go/return to/from the found facility and average staying time at the facility. It is determined whether or not the required time satisfies the search condition (S36). When the required time satisfies the search condition (YES at S36), the facility search section 28 determines the facility as a facility to be proposed (S38). When the required time does not satisfy the search condition (NO at S36), the facility search section 28 deletes the facility and newly selects another facility (S32).

The above operation enables the facility search section 28 to search for facilities to be proposed from the living area. The facility search section 28 also searches for facilities to be proposed from the non-living area, with similar processing to the processing in the case of the living area (S32 to S38). The above explained configuration and operation of the destination proposal system 10 according to the present embodiment.

The destination proposal system 10 according to the present embodiment determines a search range based on the tendency of past required time for outing acquired from the travel history data. This enables to propose facilities within the user's activity range as destination candidates.

Further, an area arrivable from a road link having a number of outings equal to or greater than a predetermined criterion within predetermined time is determined as a living area, while the other area than the living area, as a non-living area. Facilities are searched for from the living area and the non-living area at a ratio acquired from data on the past outings. This enables to propose appropriate facilities conforming to the user's behavior pattern.

Further, since facilities where required time between departure/return from/to home is conforming to the user's behavior pattern in the past outings are proposed, facilities can be proposed which the user can easily visit also in view of staying time in destinations.

Second Embodiment

Next, the destination proposal system 10 according to a second embodiment of the present disclosure will be described. The basic configuration of the destination proposal system 10 according to the second embodiment is the same as that of the destination proposal system 10 according to the first embodiment, however, the way of user model generation is different from that in the first embodiment.

Figure 12:
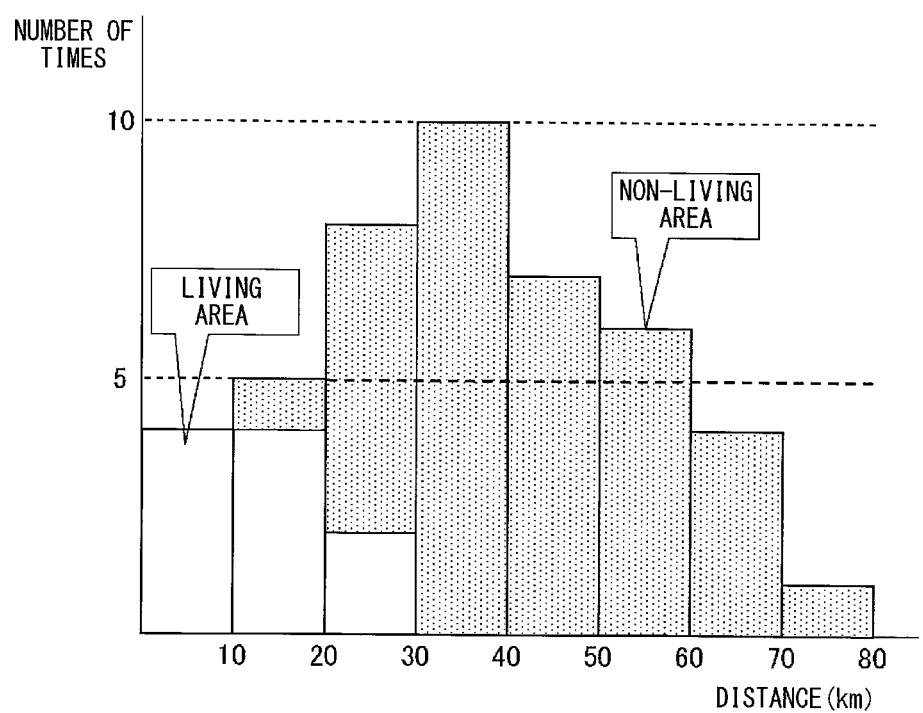
FIG. 12 illustrates an example of the user model according to a second embodiment.

FIG. 12 illustrates an example of the user model generated with the destination proposal system 10 according to the second embodiment. As shown in FIG. 12, a histogram generated by counting the number of outings by distance to a destination is used as a user model. In the second embodiment, the search condition determination section 26 determines a search range based on distance to a destination, and the facility search section 28 searches for facilities within the search range. More particularly, on the assumption that a maximum value of distance to a destination is a search range, in the example shown in FIG. 12, a range with a radius of 80 km from home is determined as a search range. Note that in the second embodiment, as in the case of the first embodiment, a search range may be determined by using an average value of distances to destinations or a distance to a destination having a maximum frequency value of the number of outings.

The destination proposal system according to the present embodiment determines a search range based on the tendency of past distances to destinations acquired from the travel history data. This enables to propose facilities within the user's activity range as destination candidates. Further, facilities are searched for from the living area and the non-living area at a ratio acquired from data on past outings. This can propose appropriate facilities conforming to the user's behavior pattern.

Note that in the first embodiment, after the search for facilities within a search range, it is necessary to check whether or not the facilities found through the search satisfy the search condition of required time (steps S34 and S36 in FIG. 10). In the second embodiment, it is not necessary to check whether or not the facilities found through the search satisfy the search condition.

The destination proposal system according to the embodiments of the present disclosure have been described in detail as above. However, the destination proposal system according to the present disclosure is not limited to the embodiments.

In the embodiments, as shown in FIG. 4B, a peripheral area of a normal road link is determined as a living area. However, only an area along the normal road link as shown in FIG. 4A may be determined as a living area. This area corresponds to a range arrivable from the normal road link in required time of 0 minute.

In the above embodiments, the processing of destination proposal is performed with one unit. However, in the destination proposal system, the processing may be performed with a plurality of units (a server and a terminal) connected with a network.

Figure 13:
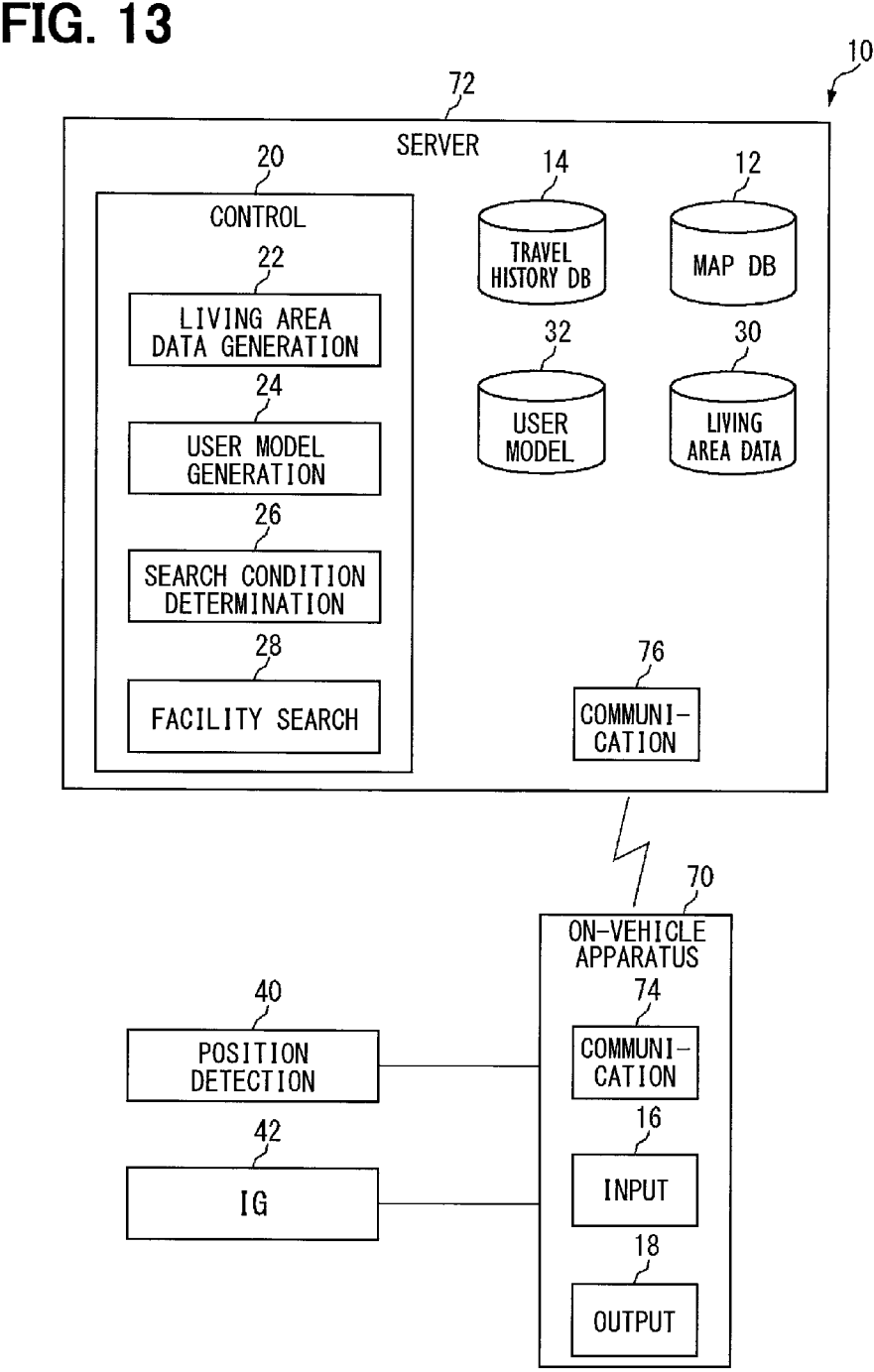
FIG. 13 illustrates an example of the destination proposal system connected with a network.

FIG. 13 illustrates a configuration of the destination proposal system 10, including the input part 16 and the output part 18 on the side of an on-vehicle apparatus 70, while having other constituent elements than those units on the side of a server 72. The on-vehicle apparatus 70 and the server 72 respectively include communication parts 74 and 76, and are communication-connected via the network. In this configuration, the on-vehicle apparatus 70 transmits the travel history data of the vehicle detected with the current position detection unit 40 to the server 72. The server 72 accumulates the travel history data received from the on-vehicle apparatus 70 into the travel history DB 14. When a destination proposal request is inputted from the input part 16 of the on-vehicle apparatus 70, the on-vehicle apparatus 70 transmits the request to the server. The server 72 searches for facilities as destination candidates as in the above embodiment. The server 72 transmits data on the facilities found through the search to the on-vehicle apparatus 70. The on-vehicle apparatus 70 outputs data on the facilities received from the server 72 from the output part 18. The configuration shown in FIG. 13 is merely an example, and there are other ways of function distribution on the network. For example, the operations up to the calculation of facility search condition may be performed on the on-vehicle apparatus side, and a search for facilities within the range may be performed with the server.

In the embodiments, a histogram is generated by counting the number of outings in a case where the destination is in the living area and in a case where the destination is in the non-living area. However, the number of outings may be further counted with regard to destinations in both of the living area and the non-living area. Further, when places in both of the living area and the non-living area are destinations, they may be included in the non-living area upon counting. The user may go out to the non-living area and then stop over a destination in the living area.

In the embodiments, the user model generation section generates a user model in accordance with day of week and time zone of departure date and time. The user model generation section may generate a user model which differs in accordance with weather, presence/absence of coocupant, or season, in addition to day of week and time zone. This can improve the accuracy of prediction of the user's behavior pattern.

In the embodiments, the destination proposal system proposes facilities which the user has not visited. However, the destination proposal system may propose facilities where the number of visits by the user is equal to or less than a predetermined threshold value (e.g. twice) or facilities which the user has not visited in a predetermined period (has not visited in last 6 months).

In the destination proposal system according to the present disclosure, facilities which the user has stopped over and facilities at which the staying time is equal to or less than a predetermined threshold value determined by facility may be excluded from the search objects based on the travel history data. Note that the predetermined threshold value determined by facility is time necessary to utilize the facility. When the user has not stayed for the time necessary to utilize the facility, it is conceivable that the user has not enjoyed staying there and left. This enables to propose appropriate destination candidates by not proposing such facility.

The present disclosure is available as a navigation apparatus which has an advantage that can propose appropriate facilities conforming to the user's activity range and behavior pattern, and which is capable of proposing new destinations.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A destination proposal system comprising:
   a map database holding map data including facility data;
   a travel history database holding travel history data that are (i) data on a road link where a vehicle has travelled and (ii) data on an arrival point;
   a living area data generation section that
      acquires a road link where the number of times of traveling is equal to or higher than a predetermined criterion based on the travel history data,
      determines a predetermined area including the road link as a living area, and
      generates living area data;
   a user model generation section that
      assumes one outing as a travel that departs from a hub point and returns to the hub point, the number of times of departing from the hub point being equal to or greater than a predetermined number of times,
      acquires, based on the travel history data, the number of outings with respect to either (i) each of necessary times required for outings or (ii) each of distances to destinations of outings, in accordance with whether the destination of outing is in a living area or a non-living area, and
      generates model data of an outing pattern of a user;
   a search condition determination section that
      determines, using the model data, a facility search range based on either (i) a maximum value or a mean value of the required times for outings or the distances to destinations, or (ii) the required time or the distance to destination having the number of outings that exhibits a maximum frequency value, and
      determines a ratio between (i) the number of facilities to be searched for from the living area and (ii) the number of facilities to be searched for from the non-living area, based on the number of outings to the living area and the number of outings to the non-living area;
   a facility search section that performs a search that searches for facilities in the living area and facilities in the non-living area corresponding to the ratio from the map database within the facility search range determined by the search condition determination section; and
   an output part that presents facilities found through the search to the user.

2. The destination proposal system according to claim 1, wherein:
   the user model generation section generates the model data with respect to either day of week of departing or time zone of departing; and
   the search condition determination section determines a facility search condition based on the model data with respect to either day of week of departing or time zone of departing that is, respectively, identical to day of week of departing or time zone of departing of departure date and time for destination proposal.

3. The destination proposal system according to claim 1, wherein
   the living area data generation section acquires either (i) a road link where the number of times of traveling is equal to or greater than a predetermined number of times or (ii) a road link where the number of times of traveling in a predetermined period is equal to or greater than a predetermined number of times.

4. The destination proposal system according to claim 1, wherein
   the living area data generation section determines a living area as either (i) an area arrivable from the road link within a predetermined time or (ii) an area within a predetermined distance from the road link.

5. The destination proposal system according to claim 1, wherein
   the output part outputs advertisement data regarding a facility in the living area, while outputting outline data regarding a facility in the non-living area.

6. The destination proposal system according to claim 1, wherein
   the facility search section searches for either (i) a facility which the user has never visited or (ii) a facility having the number of visits being equal to or smaller than a predetermined number of times, by referring to the travel history data.

7. The destination proposal system according to claim 1, wherein
   the facility search section excludes, from search objects, a facility that the user has visited and stayed within a time that is equal to or less than a predetermined threshold value determined depending on the facility, by referring to the travel history data.

8. A destination proposal method in a destination proposal system including (i) a map database holding map data including facility data, and (ii) a travel history database holding travel history data that are (i) data on a road link where a vehicle has travelled and (ii) data on an arrival point, the method comprising:
a living area data generating that
acquires a road link where the number of times of traveling is equal to or higher than a predetermined criterion based on the travel history data,
determines a predetermined area including the road link as a living area, and
generates living area data;
a user model generating that
assumes one outing as a travel that departs from a hub point and returns to the hub point, the number of times of departing from the hub point being equal to or greater than a predetermined number of times,
acquires, based on the travel history data, the number of outings with respect to either (i) each of necessary times required for outings or (ii) each of distances to destinations of outings, in accordance with whether the destination of outing is in a living area or a non-living area, and
generates model data of a user's outing pattern;
a search condition determining that
determines, using the model data, a facility search range based on either (i) a maximum value or a mean value of the required times for outings or the distances to destinations, or (ii) the required time or the distance to destination having the number of outings that exhibits a maximum frequency value, and
determines a ratio between (i) the number of facilities to be searched for from the living area and (ii) the number of facilities to be searched for from the non-living area, based on the number of outings to the living area and the number of outings to the non-living area;
a facility searching that performs a search that searches for facilities in the living area and facilities in the non-living area corresponding to the ratio from the map database within the facility search range determined by the search condition determination section; and
an outputting that presents facilities found through the search to the user.

9. A non-transitory storage medium containing instructions of a program product, the instructions being read out and executed by a computer to permit the computer to perform a destination proposal,
the instructions of the program product comprising the method according to claim 8.

10. A destination proposal system comprising:
a map database configured to hold map data including facility data;
a travel history database configured to hold travel history data that are (i) data on a road link where a vehicle has travelled and (ii) data on an arrival point;
a control circuit; and
an output interface,
the control circuit being configured to
acquire a road link where the number of times of traveling is equal to or higher than a predetermined criterion based on the travel history data,
determine a predetermined area including the road link as a living area, and
generate living area data;
the control circuit being further configured to
assume one outing as a travel that departs from a hub point and returns to the hub point, the number of times of departing from the hub point being equal to or greater than a predetermined number of times,
acquire, based on the travel history data, the number of outings with respect to either (i) each of necessary times required for outings or (ii) each of distances to destinations of outings, in accordance with whether the destination of outing is in a living area or a non-living area, and
generate model data of an outing pattern of a user;
the control circuit being further configured to
determine, using the model data, a facility search range based on either (i) a maximum value or a mean value of the required times for outings or the distances to destinations, or (ii) the required time or the distance to destination having the number of outings that exhibits a maximum frequency value, and
determine a ratio between (i) the number of facilities to be searched for from the living area and (ii) the number of facilities to be searched for from the non-living area, based on the number of outings to the living area and the number of outings to the non-living area;
the control circuit being further configured to
perform a search that searches for facilities in the living area and facilities in the non-living area corresponding to the ratio from the map database holding the map data within the facility search range that is determined,
wherein the output interface presents facilities found through the search to the user.

11. The destination proposal system according to claim 10, wherein:
the control circuit generates the model data with respect to either day of week of departing or time zone of departing; and
the control circuit determines a facility search condition based on the model data with respect to either day of week of departing or time zone of departing that is, respectively, identical to day of week of departing or time zone of departing of departure date and time for destination proposal.

12. The destination proposal system according to claim 10, wherein
the control circuit acquires either (i) a road link where the number of times of traveling is equal to or greater than a predetermined number of times or (ii) a road link where the number of times of traveling in a predetermined period is equal to or greater than a predetermined number of times.

13. The destination proposal system according to claim 10, wherein
the control circuit determines a living area as either (i) an area arrivable from the road link within a predetermined time or (ii) an area within a predetermined distance from the road link.

14. The destination proposal system according to claim 10, wherein
the output interface outputs advertisement data regarding a facility in the living area, while outputting outline data regarding a facility in the non-living area.

15. The destination proposal system according to claim 10, wherein
the control circuit searches for either (i) a facility which the user has never visited or (ii) a facility having the number of visits being equal to or smaller than a predetermined number of times, by referring to the travel history data.

16. The destination proposal system according to claim 10, wherein the control circuit excludes, from search objects, a facility that the user has visited and stayed within a time that is equal to or less than a predetermined threshold value determined depending on the facility, by referring to the travel history data.

17. A destination proposal system comprising:
a map database configured to hold map data including facility data;
a travel history database configured to hold travel history data that are (i) data on a road link where a vehicle has travelled and (ii) data on an arrival point;
an output interface; and
a control circuit provided as a computer having an CPU, and memory storing instructions,
the control circuit being configured to, by the CPU executing the instructions,
  acquire a road link where the number of times of traveling is equal to or higher than a predetermined criterion based on the travel history data,
  determine a predetermined area including the road link as a living area, and
  generate living area data;
the control circuit being further configured to, by the CPU executing the instructions,
  assume one outing as a travel that departs from a hub point and returns to the hub point, the number of times of departing from the hub point being equal to or greater than a predetermined number of times,
  acquire, based on the travel history data, the number of outings with respect to either (i) each of necessary times required for outings or (ii) each of distances to destinations of outings, in accordance with whether the destination of outing is in a living area or a non-living area, and
  generate model data of an outing pattern of a user;
the control circuit being further configured to, by the CPU executing the instructions,
  determine, using the model data, a facility search range based on either (i) a maximum value or a mean value of the required times for outings or the distances to destinations, or (ii) the required time or the distance to destination having the number of outings that exhibits a maximum frequency value, and
  determine a ratio between (i) the number of facilities to be searched for from the living area and (ii) the number of facilities to be searched for from the non-living area, based on the number of outings to the living area and the number of outings to the non-living area;
the control circuit being further configured to, by the CPU executing the instructions,
  perform a search that searches for facilities in the living area and facilities in the non-living area corresponding to the ratio from the storage holding the map data within the facility search range that is determined,
wherein the output interface presents facilities found through the search to the user.

* * * * *